United States Patent
Tomlinson et al.

(10) Patent No.: US 10,058,794 B2
(45) Date of Patent: Aug. 28, 2018

(54) NOZZLE/HEADER DESIGN FOR POLYSTYRENE

(71) Applicant: FINA TECHNOLOGY, INC., Houston, TX (US)

(72) Inventors: John Tomlinson, Houston, TX (US); Jose Sosa, Deer Park, TX (US); Carlos R. Corleto, Houston, TX (US); Roy Kennedy, Prairieville, LA (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 15/085,464

(22) Filed: Mar. 30, 2016

(65) Prior Publication Data
US 2017/0282092 A1  Oct. 5, 2017

(51) Int. Cl.
| | |
|---|---|
| *B01D 1/00* | (2006.01) |
| *B01D 1/04* | (2006.01) |
| *C08F 6/00* | (2006.01) |
| *B01D 1/06* | (2006.01) |
| *B01D 1/22* | (2006.01) |
| *C08F 112/08* | (2006.01) |

(52) U.S. Cl.
CPC ............... *B01D 1/007* (2013.01); *B01D 1/04* (2013.01); *B01D 1/06* (2013.01); *B01D 1/22* (2013.01); *C08F 6/005* (2013.01)

(58) Field of Classification Search
CPC . B01D 1/007; B01D 1/06; C08F 6/001; C08F 6/005
USPC .................................... 159/2.1, 2.3; 528/501
See application file for complete search history.

(56) References Cited

U.S. PATENT DOCUMENTS

| | | |
|---|---|---|
| 2,268,360 A | 12/1941 | Walker |
| 2,343,152 A | 2/1944 | Marx |
| 2,703,968 A | 3/1955 | Berestneff |
| 3,228,644 A | 1/1966 | Sand |
| 3,966,538 A | 6/1976 | Hagberg et al. |
| 4,294,652 A | 10/1981 | Newman |
| 4,637,193 A | 1/1987 | Lange |
| 4,702,397 A | 10/1987 | Gortz |
| 4,727,979 A | 3/1988 | Wolfson et al. |
| 4,816,524 A | 3/1989 | Anzai et al. |
| 4,863,568 A | 9/1989 | Wijn |

(Continued)

FOREIGN PATENT DOCUMENTS

JP  S6447878 A  2/1989

OTHER PUBLICATIONS

International Search Report and Written Opinion issued in PCT/US17/21875 dated May 26, 2017, 12 pages.

*Primary Examiner* — Fred M Teskin
(74) *Attorney, Agent, or Firm* — Albert Shung

(57) ABSTRACT

A vessel header includes lateral flow tubes arranged in a parallel configuration. The lateral flow tubes enter the vessel header through alternating vessel header penetrations with a single vessel header penetration per lateral flow tube. Each lateral flow tube has a perforated section within the vessel header having a non-circular cross-section having the shape of a circular sector, an elliptical sector, or an irregular quadrilateral. A method includes passing a molten polymer through the lateral flow tubes of the vessel header. The molten polymer exits the lateral flow tubes as strands through perforations in the lateral flow tubes within the vessel header. The method includes obtaining devolatilized polymer.

26 Claims, 16 Drawing Sheets

(56) References Cited

U.S. PATENT DOCUMENTS

| | | | |
|---|---|---|---|
| 4,934,433 A | 6/1990 | Aboul-Nasr | |
| 4,972,902 A | 11/1990 | Ninomiya | |
| 5,069,750 A | 12/1991 | Aboul-Nasr | |
| 5,118,388 A | 6/1992 | Aboul-Nasr | |
| 5,140,848 A | 8/1992 | Spencer | |
| 5,184,585 A | 2/1993 | Wilson | |
| 5,540,813 A | 7/1996 | Sosa et al. | |
| 5,551,354 A | 9/1996 | Crofut et al. | |
| 5,599,469 A | 2/1997 | Yoshino | |
| 5,649,043 A | 7/1997 | Adams et al. | |
| 5,874,525 A | 2/1999 | Krupinski et al. | |
| 6,124,426 A | 9/2000 | Sugimoto et al. | |
| 6,780,281 B1 | 8/2004 | Elsner et al. | |
| 7,087,139 B1 * | 8/2006 | Berti | B01D 3/06 159/17.4 |
| 7,658,817 B2 * | 2/2010 | Fukuoka | B01D 1/22 159/27.4 |
| 7,754,849 B2 | 7/2010 | Corleto et al. | |
| 8,241,459 B2 | 8/2012 | Tomlinson et al. | |
| 2005/0097748 A1 | 5/2005 | Corleto et al. | |
| 2007/0120285 A1 | 5/2007 | Corleto et al. | |
| 2007/0291446 A1 | 12/2007 | Abram | |

\* cited by examiner

NOZZLE/HEADER DESIGN FOR POLYSTYRENE

CROSS-REFERENCE TO RELATED APPLICATIONS

Not applicable.

FIELD

Embodiments of the present disclosure generally relate to fluid exchange vessels. More particularly, embodiments of the present disclosure relate to devolatilizer nozzles and methods of distributing fluid within fluid exchange vessels.

BACKGROUND

Polymer may be recovered from a polymerization reactor and fed to a devolatilizer where components such as unreacted monomer or solvent may be removed from the polymer. For example, volatiles may be removed by vacuum distillation, flash devolatization, stripping, increasing polymer surface area, or combinations thereof. The surface area of a polymer may be increased by passing the polymer through a devolatilizer nozzle, which is an arrangement of one or more flow tubes having small perforations or holes directed downward in a vessel for discharging molten polymer downward from the holes in continuous vertical strands. The polymer strands provide increased surface area for devolatilization of the polymer. As the polymer strands fall in the devolatilization vessel, the unreacted monomer and solvent are released while the polymer strands collect at the bottom of the vessel. The devolatilized polymer may then be sent to subsequent polymer processing steps.

SUMMARY

The present disclosure provides for a vessel header. The vessel header has a plurality of alternating vessel header penetrations. A plurality of lateral flow tubes are arranged in a parallel configuration. Each lateral flow tube enters the vessel header through one of the alternating vessel header penetrations with a single vessel header penetration per lateral flow tube. Each lateral flow tube has a perforated section located within the vessel header. The perforated section has a non-circular cross-section. The non-circular cross-section has the shape of a circular sector, an elliptical sector, or an irregular quadrilateral.

The present disclosure provides for a method. The method includes passing a molten polymer through lateral flow tubes of a vessel header. The lateral flow tubes are arranged in a parallel configuration and enter the vessel header through a plurality of alternating vessel header penetrations with a single vessel header penetration per lateral flow tube. The molten polymer exits the lateral flow tubes as strands through perforations in the lateral flow tubes within the vessel header. The lateral flow tubes have a non-circular cross-section. The non-circular cross-section has the shape of a circular sector, an elliptical sector, or an irregular quadrilateral. The method includes obtaining devolatilized polymer.

BRIEF DESCRIPTION OF DRAWINGS

The present disclosure may be understood from the following detailed description when read with the accompanying figures.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure relate a vessel header having multiple lateral flow tubes ("flow tubes"). The flow tubes are arranged in a parallel configuration and enter the vessel header through alternating header penetrations with a single header penetration per lateral flow tube. Within the vessel, the flow tubes have perforated sections, also referred to as a nozzle or devolatilizer nozzle, that have non-circular cross-sections. The non-circular cross-section has the shape of a circular sector, an elliptical sector, or an irregular quadrilateral. A majority of the perforations in the flow tube have a maximum strand angle of equal to or less than 45 degrees, or 52 degrees, or 52.5 degrees, or 65 degrees.

Header Design

Figure 1A:
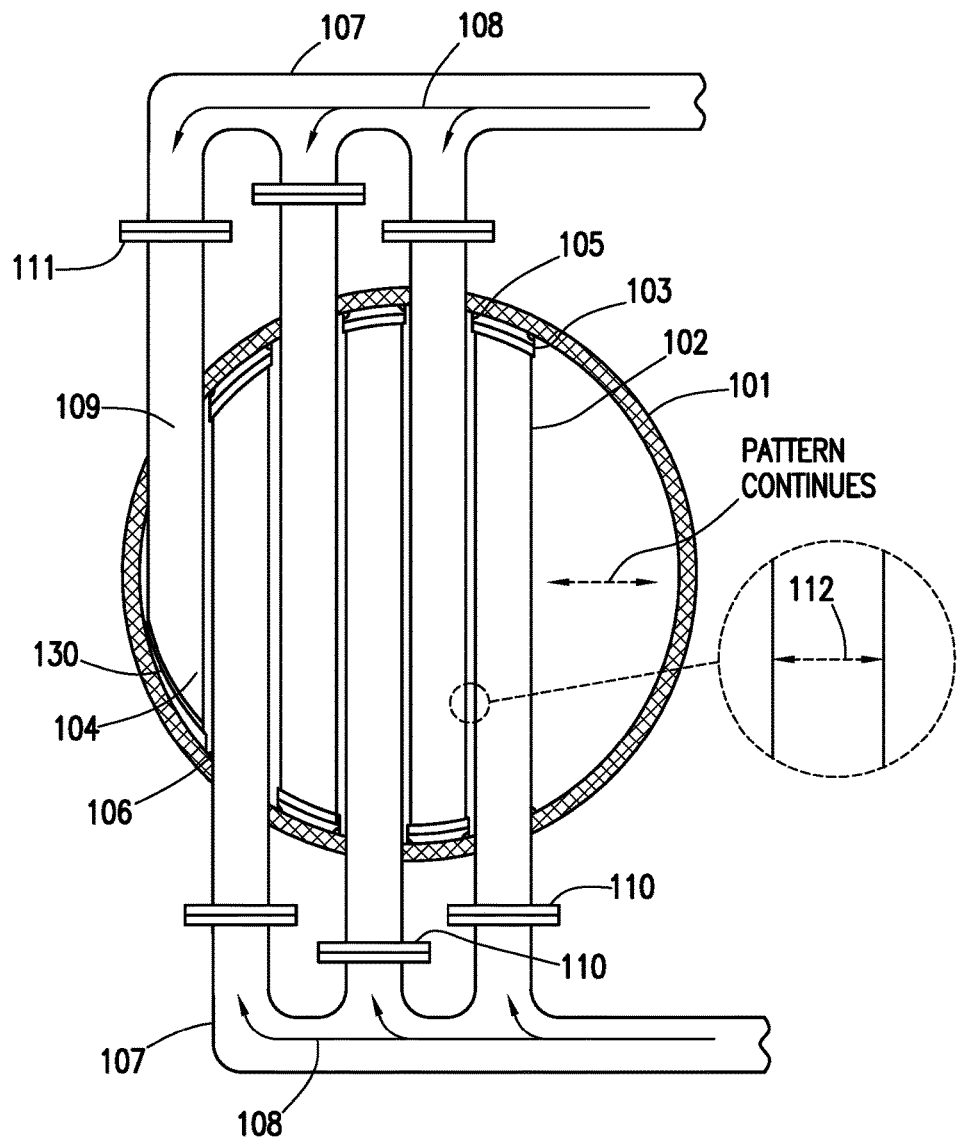
FIG. 1A is a top plan view of a polymer melt distributor vessel header design in accordance with certain embodiments of the present disclosure.
Figure 1B:
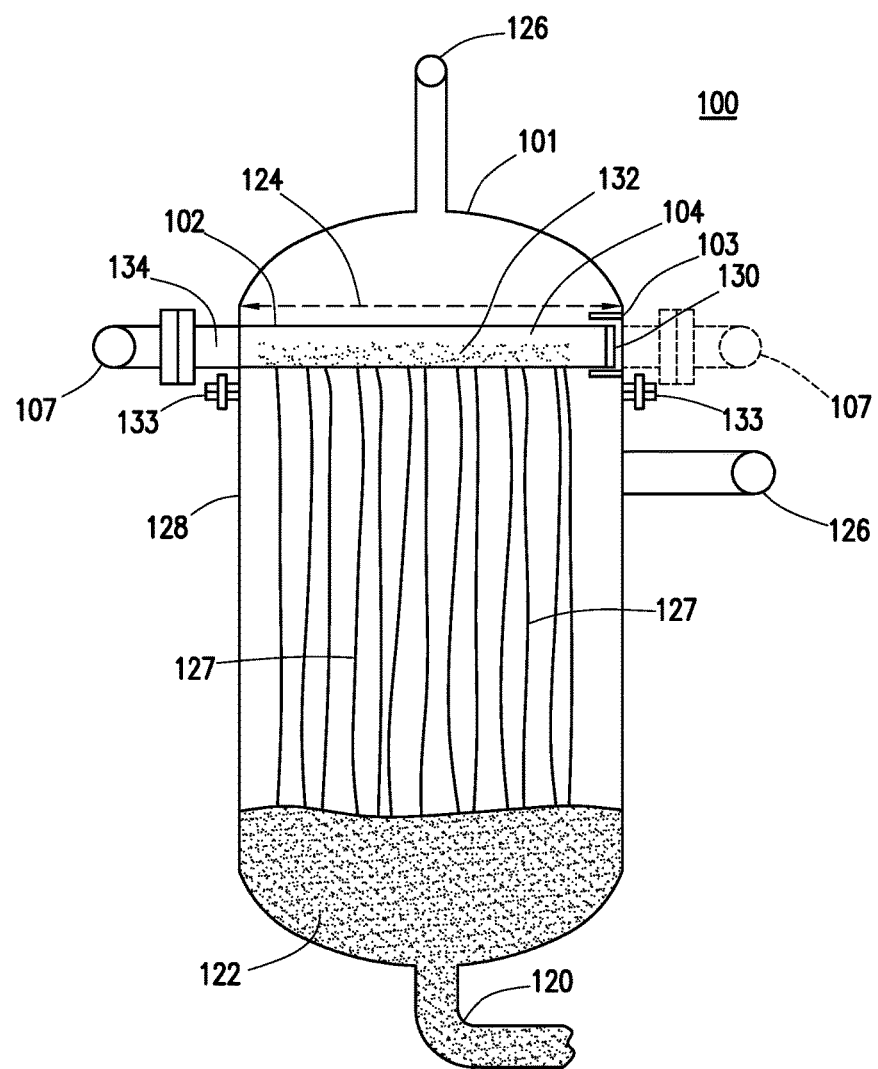
FIG. 1B is a partial side plan view of a polymer melt distributor vessel design in accordance with certain embodiments of the present disclosure.

As shown in FIGS. 1A and 1B, a fluid distribution system may include a devolatilizer vessel 100 having a vessel header 101 and a vessel body 128. Devolatilizer vessel 100 may be used to remove volatile components from a polymer prior to further polymer manufacturing processes, such as pelletizing and forming.

Vessel header 101 may be located adjacent and above vessel body 128. Vessel header 101 may be connected to vessel body 128 through the use of a flanged connection 133, a welded connection, or any other connection method capable of sealing against leakage between vessel header 101 and vessel body 128, as would be known to one skilled in the art. Vessel header 101 and vessel body 128 may provide a substantially sealed environment for the processing of a fluid. In embodiments, vessel header 101 and vessel body 128 are circular in shape. In embodiments, vessel body 128 is cylindrical, conical, or truncated conical in shape, and vessel header 101 is dome-like in shape. In some embodiments, vessel header 101 and vessel body 128 have a non-circular shape. Vessel header 101 and vessel body 128 may be formed of a material that withstands differential pressure between a vessel interior and a vessel exterior, as well as elevated operating temperatures. For example and without limitation, vessel header 101 and vessel body 128 may be formed of steel. In some embodiments, vessel header 101 and vessel body 128 include insulation and/or reinforcement plating surrounding vessel header 101 and vessel body 128.

Vessel header 101 and vessel body 128 may be sized according to various criteria, such as the polymer devolatilization throughput requirements, production rate, material strength, pressure rating, and other factors as known to one of ordinary skill in the art. In embodiments, the diameter of vessel header 101 and vessel body 128 may be between 35 and 240 inches, between 50 and 210 inches, or between 70 inches and 195 inches.

Flow tubes 102 may be located near the interface of vessel body 128 and vessel header 101 for distribution of fluid within vessel body 128. Flow tubes 102 may be arranged substantially parallel to a plane of the interface between vessel header 101 and vessel body 128, and may be further arranged substantially perpendicular to sidewalls of vessel body 128.

In embodiments, vessel header 101 may include between 2 and 100, 2 and 90, 2 and 80, 2 and 70, 2 and 60, or 2 and 50 flow tubes 102. The number of flow tubes 102 may be a function of vessel size, flow tube size, flow tube shape, production rate, throughput requirements, material strength, and pressure rating requirements. Flow tubes 102 may be pipes or conduits for conveyance of a fluid.

In order to facilitate removal and maintenance, flow tubes 102 may be approximately straight and may optionally have an end cap 130 that may be removable. End cap 130 may also be used to provide a support for flow tubes 102 within the vessel header 101 and may be shaped to take any internal curvature of vessel header 101 into account.

Each individual flow tube 102 may enter vessel header 101 through a single vessel header penetration 109 and be supported within vessel header 101 by an internal support structure 103. Internal support structure 103 may be welded to the interior surface of vessel header 101 via welds 105. Internal support structure 103 may support end 104 of the flow tubes 102 within the vessel header 101. As used herein, vessel header penetration 109 includes any opening created in vessel header 101 through which a flow tube 102 passes through to the interior of vessel header 101. Internal support structure 103 is a device for providing mechanical support to the end of a flow tube 102 opposite vessel header penetration 109 within vessel header 101. Vessel header penetrations 109 of adjacent flow tubes 102 may be on opposite sides of vessel header 101 such that vessel header penetrations 109 form an alternating pattern. Spacing between flow tubes 102 is minimized through the use of alternating vessel header penetrations 109. The decreased spacing may result in an increase in the usable flow tube surface area within the vessel header 101 and vessel body 128. As a result of the increase in the usable surface area, the throughput capacity of the devolatilizer vessel 100 may be increased.

Internal support structure 103 may also form an alternating pattern along the interior of vessel header 101. Flow tubes 102 may be connected to vessel header 101 by any method capable of sealing flow tubes 102 in vessel header penetration 109. For example, flow tubes 102 may be welded into the vessel header penetrations 109, may be externally flanged to the vessel header penetrations 109, may be internally flanged to the vessel header penetrations 109, or combinations thereof.

Internal support structure 103 design may involve consideration of its ability to alleviate mechanical stresses on flow tubes 102 and allow for thermal expansion and contraction of vessel header 101 in relation to flow tubes 102. In embodiments, internal support structure 103 design may depend on the vessel size, vessel operating conditions, and number and type of flow tubes 102.

Flow tubes 102 may have flanged connection 111 for sealingly connecting to external distribution manifold 107 for conveyance of fluid to the interior of vessel header 101. External distribution manifold 107 may supply fluid to flow tubes 102. In some embodiments, more than one external distribution manifold 107 may be used to supply fluid to flow tubes 102. In embodiments, flow tubes 102, which may be present in an even number, may be supplied fluid by two external distribution manifolds 107. Such embodiments may result in the same number of flow tubes 102 being supplied by each external distribution manifold 107, which may simplify external distribution manifold 107 design and facilitate even fluid distribution. In alternative embodiments, the devolatilizer vessel 100 may include an odd number of flow tubes 102.

Flanged connections 111, removable parts such as end cap 130, and internal support structure 103 allow access to the respective components for inspection, cleaning, and maintenance. In addition, flanged connections 111 allow for changing or replacing flow tubes 102 individually, which allows for repair and modification. Also, flanged connections 111 provide the ability to blind individual flow tubes 102 to reduce devolatilizer vessel 100 capacity, maintain optimal flow rates and patterns in vessel header 101, and isolate individual flow tubes 102 due to damage or plugging. Flanged connections 111 may also provide the ability to introduce orifice plates or restriction plates for polymer distribution management within vessel header 101 and vessel body 128.

In some embodiments, the diameter of the flanged connections 111 may be large enough so that adjacent flanges would be in contact or overlap if they were aligned. In such embodiments, flanged connections 111 may be staggered 110 such that flanged connections 111 do not align, or do not directly align, with adjacent flanged connections 111. Staggered flanged connections 111 may decrease flow tube spacing 112 and increase the number of flow tubes 102 within vessel header 101. As used herein, staggered alignment refers to the arrangement of flanged connections 111 outside vessel header 101 in a direction perpendicular to the flanged connections 111 longitudinal axis such that adjacent flanged connections 111 are not in an approximately horizontal plane. Such staggered alignment, configuration, or pattern may be achieved by varying the distance from vessel header 101 to adjacent flanged connections 111. The decrease in flow tube spacing 112 may be limited by minimum weld root spacing requirements (discussed below with reference to FIGS. 2A-3C). Embodiments with staggered 110 flanged connections 111 may allow a greater number of flow tubes 102 to be placed in vessel header 101, which may increase perforated section 132 and the fluid distribution system capacity.

Flow tubes 102 include flow section 134 coupled with perforated section 132. Flow section 134 conducts molten polymer from an external polymer source to perforated section 132 within vessel header 101. Perforated section 132, also referred to as a nozzle or devolatilizer nozzle, may include one or more perforations or holes from which molten polymer may exit and form strands 127. Perforated section 132 may be located within vessel header 101. Flow tubes 102 may be arranged with parallel and alternating vessel header penetrations 109 to increase the number of flow tubes 102 and useable flow tube surface area, for example the area suitable for perforated section 132, within vessel header 101. In embodiments, flow tubes 102 may be arranged parallel to one another in order to decrease flow tube spacing 112 and increase the number of flow tubes 102 that may be placed within vessel header 101. Flow tube spacing 112 refers to the closest distance between the outer surfaces of adjacent flow tubes 102 inside vessel header 101 as measured perpendicular to the surface of flow tubes 102. Embodiments utilizing a parallel flow tube 102 arrangement with alternating vessel header penetrations 109 may increase throughput capacity of polymer through devolatilizer vessel 100. In embodiments, flow tube spacing 112 may be from 1 to 10 inches, from 1 to 8 inches, or from 1.5 to 6 inches.

Vessel header penetrations 109 may alternate between sides of vessel header 101. Internal support structure 103 may be located along vessel header 101 interior surface opposite vessel header penetrations 109. An alternating pattern may include vessel header penetration 109 located adjacent internal support structure 103. For example, an internal cradle may be created and repeated along the interior surface of vessel header 101. The alternating pattern of flow tubes 102 may extend across substantially the entire cross section of vessel header 101.

In embodiments, flow tubes 102 may be connected directly to vessel header 101 through welded connections 106 at the vessel header penetrations 109. Welded connections 106 may structurally and sealingly connect flow tubes 102 to vessel header 101 while maintaining the structural integrity of vessel header 101.

Devolatilizer vessel 100 may have a devolatilized polymer outlet 120 and a volatile vapor outlet 126. Devolatilized polymer outlet 120 may be connected at or near the bottom of devolatilizer vessel 100 and used to convey the devolatilized polymer to downstream processing units. Devolatilized polymer outlet 120 may include one or more pipes and/or connections to facilitate polymer collection or reduce required pump size. Volatile vapor outlet 126 may be connected at or near the top of vessel body 128 and/or vessel header 101 and used to remove the volatiles that exit the polymer within devolatilizer vessel 100. Volatile vapor outlet 126 may include one or more pipes and/or connections to balance vapor flows. FIG. 1A indicates the direction of flow 108 through the flow tubes 102 while FIG. 1B indicates the direction of polymer flow 124 into the devolatilizer vessel 100.

In embodiments, molten polymer is fed to devolatilization vessel 100 through flow tubes 102. For example, molten polymer may be fed to devolatilizer vessel 100 from one or more upstream devolatilization systems, such as a flash devolatilizer. The molten polymer flows into and through the flow tubes 102, and exits the perforated sections 132 in the form of strands 127 that collect and re-pool in the bottom vessel body 128 as molten mass 122. Volatiles exit the polymer strands 127. In embodiments, the devolatilizer vessel 100 is used to remove volatiles such as styrene monomer from polystyrene. In embodiments, the devolatilized polymer is polystyrene containing equal to or less than about 1000, 900, 800, 700, 600, 500, 400, 300, 200, 100, or 50 ppm of styrene monomer. Volatiles exit the strands 127, and exit vessel body 128 through volatile vapor outlet 126. The devolatilized polymer exits vessel body 128 via devolatilized polymer outlet 120, which may transmit the devolatilized polymer to a finishing operation, such as a pelletizer.

Figure 2A:
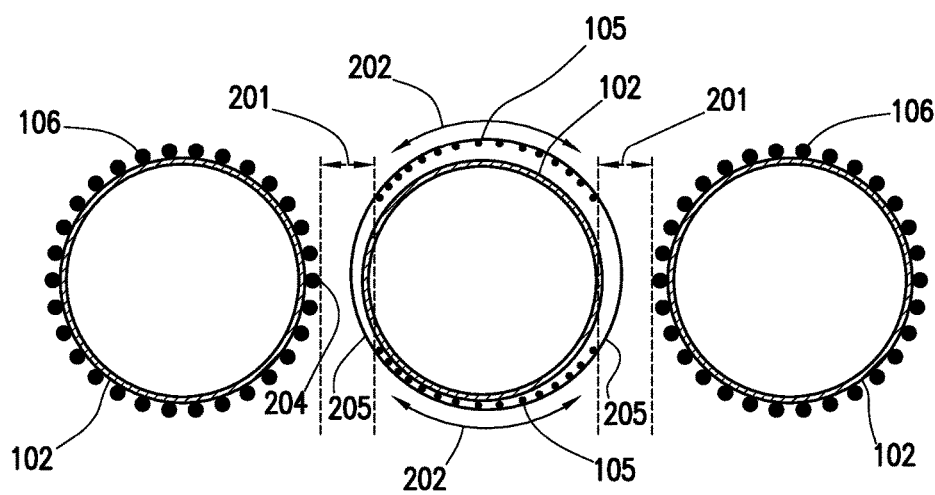
FIG. 2A is a partial cross-sectional view of an internal support structure along an interior wall of a vessel header in accordance with certain embodiments of the present disclosure.

Referring to FIG. 2A, flow tube spacing 112 may be limited by weld root spacing 201. Weld root 204 refers to a point or points at which the back of a weld intersects the base metal surface or surfaces. In embodiments, the base metal is vessel header 101 wall. Some embodiments have a one inch minimum spacing between weld roots 204, based on the heat affected zone from the weld. One inch spacing may avoid potential weld problems due to the stresses present in the heat affected zone of the weld. By avoiding the heat affected zone, stress relieving may be avoided which may reduce fabrication costs and time. In embodiments, a typical flow tube spacing 112 may be less than or equal to four inches, less than or equal to three inches, or less than or equal to two inches. By alternating vessel header penetrations 109 and internal support structure 103, the minimum weld spacing requirements may still be met and any reinforcing vessel requirements may be more easily met. As used herein, "reinforcing vessel requirements" refers to engineering requirements for the construction of vessels as described in ASME section VIII division 1. As a result of the alternating configuration, the flow tube spacing 112 may be decreased, which may allow for more flow tubes 102 to be placed in vessel header 101, and thereby increasing the perforated section 132.

In embodiments, support cradle 205 may be welded or otherwise connected to the interior surface of vessel header 101. Weld 105 may be located along a portion or portions of support cradle 205 interior so as to form weld arc 202 along support cradle 205 bottom, top, or both. As used herein a weld arc 202 refers to a section of a weld or group of welds that extend in an arc along the inner perimeter of support cradle 205 but does not continue around the entire support cradle 205 perimeter. In embodiments, use of a weld arc 202, and in particular a weld arc interior to support cradle 205, to connect support cradle 205 to the interior vessel header surface may impact weld root spacing 201 requirements including the minimum spacing between weld roots. Weld arc 202 may be continued around the bottom, top, or the bottom and top of support cradle 205 to the extent that weld arc 202 would not be closer than the minimum weld root spacing 201 to an adjacent welded connection 106. In embodiments in which support cradle 205 includes a section of pipe or conduit of greater diameter than flow tubes 102, support cradle 205 may be connected to the interior vessel header surface using weld arc 202 placed along the inner perimeter of the support cradle 205 top, bottom, or both. Placement of weld arc 202 along the inner, rather than the outer, support cradle joint allows weld arc 202 to be extended further around the interior of support cradle 205 without violating the one inch spacing between weld roots 204. In embodiments, support cradle 205 includes a half section of pipe, and weld arc 202 is placed along the lower, inner perimeter of support cradle 205 to the extent that weld arc 202 is not located closer than the required minimum weld root spacing 201, which may avoid potential weld problems due to the stresses present in the heat affected zone of the weld. By avoiding the heat affected zone, no stress relieving is required which may reduce fabrication costs and time.

Figure 3A:
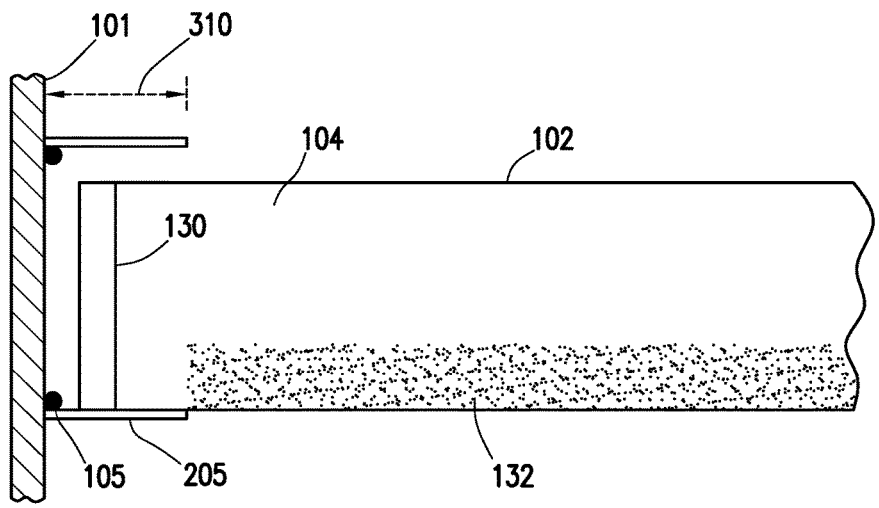
FIG. 3A is a cross-sectional side view of an internal support structure in accordance with certain embodiments of the present disclosure.

Referring to FIGS. 2A and 3A, internal support structure may be a support cradle 205 on which end 104 directly rests. Alternatively, end 104 may indirectly rest on support cradle 205 as a result of a moveable device, such as a sliding sleeve or bearing, being placed between the support cradle 205 and end 104 to allow for movement. As used herein, support cradle 205 refers to any structure capable of supporting end 104, including but not limited to a section of pipe of greater diameter than the end 104 or a half section of pipe oriented such that end 104 will rest in a stable position when placed inside. Support cradle 205 may be shaped as necessary to support end 104 based on considerations including but not limited to a non-circular flow tube 102 shape and any angles that may be produced due to a curvature in the interior vessel header surface. In embodiments, support cradle 205 may be welded to the interior surface of vessel header 101 via welds 105. End 104 may be supported by being placed in support cradle 205. Support cradle 205 may be of any length 310 sufficient to support end 104 during operation and maintenance. Several factors may affect length 310 of support cradle 205, including but not limited to requirements for thermal expansion and contraction, vessel size, flow tube length and diameter, and vessel operating conditions including operating temperature. Any length 310 beyond that necessary to support end 104 may reduce the surface area of flow tube 102 for use within vessel header 101 by covering an area that could otherwise be used for the perforation section 132.

Figure 2B:
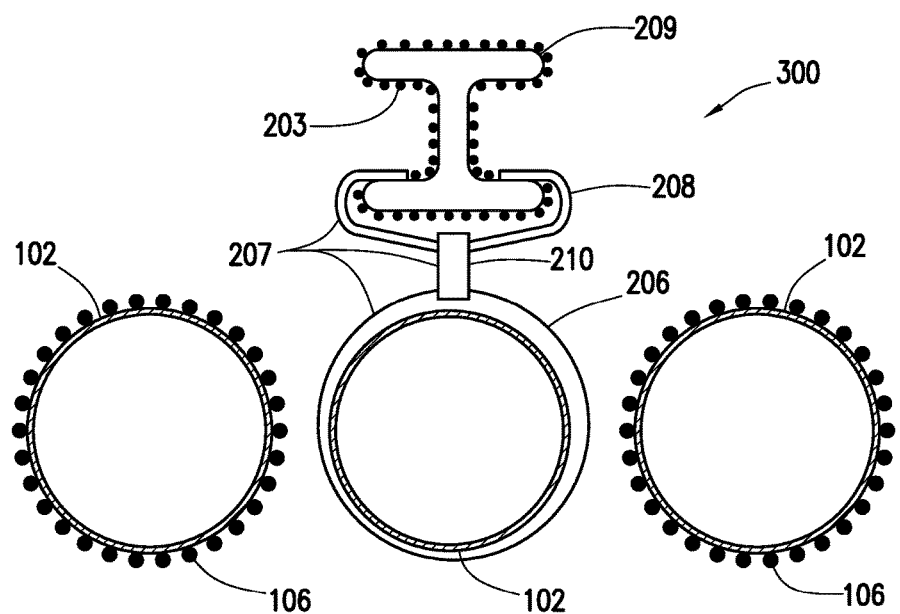
FIG. 2B is a partial cross-sectional view of an alternative internal support structure along an interior wall of a vessel header in accordance with certain embodiments of the present disclosure.
Figure 3B:
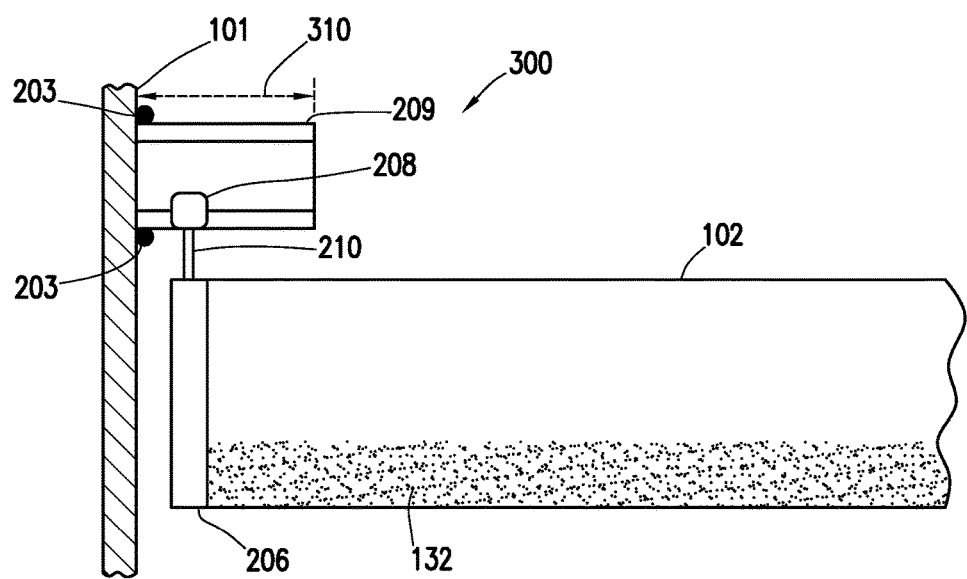
FIG. 3B is a cross-sectional side view of an internal support structure in accordance with certain embodiments of the present disclosure.

In embodiments shown in FIGS. 2B and 3B, internal support structure is a sliding cradle 300. As used herein, sliding cradle 300 includes a support structure 209, for example a support beam or rail, located above the associated flow tube 102 within vessel header 101 wherein support is provided by a hanger 207 connecting support structure 209 and the flow tube 102. Hanger 207 may move relative to support structure 209, which may allow for movement in response to thermal expansion or contraction forces. The resulting movement reduces stress on vessel header wall and flow tube 102. In embodiments, sliding cradle 300 may allow movement of flow tube 102 of less than or equal to 12 inches, or less than or equal to 3 inches, or less than or equal to 1 inch in order to account for thermal expansion of vessel header 101 during operation and allow for removal of flow tube 102 for maintenance or cleaning purposes. In embodiments, support structure 209 may be a section of an I-beam welded to the interior of vessel header 101. Support structure 209 may be a section of pipe or conduit. Support structure 209 may extend from vessel header 101 interior surface approximately horizontally above the flow tube 102 a length 310 of less than 12 inches, or less than 6 inches, or less than 2 inches. In embodiment, support cradle 205 as depicted in FIGS. 2A and 3A may extend the same length 310 from the interior of vessel header 101 surface as sliding cradle 300.

Hanger 207 may include beam clamp or beam roller 208, support rod 210, and a pipe clamp, roller, or support 206. The beam clamp or beam roller 208 may connect to support structure 209. For example, beam clamp or beam roller 208 may clamp or otherwise connect to support structure 209 while allowing for movement thereof. Support 206 supports flow tube 102. In embodiments in which support 206 is a pipe clamp, support 206 may be fixed relative to flow tube 102. Use of a roller as support 206 may allow movement relative to flow tube 102. Support rod 210 may be a mechanical connection between the beam clamp or beam roller 208 and support 206. For example, support rod 210 may have a threaded end secured by a threaded nut. In embodiments, beam roller 208 and support rod 210 are a single device that may be directly connected to flow tube 102, for example, through a welded connection to the top of the flow tube 102.

In embodiments, hanger 207 may be connected to the flow tube 102 at or near end 104 or end cap 130, such as with a weld to the top of the flow tube 102 or a threaded connection extending into the interior of flow tube 102 that is accessible via end cap 130. Such a configuration does not obstruct the bottom surface area of flow tube 102, allowing for an increase in perforated section 132 within the vessel header 101 and an increase in capacity.

In embodiments, sliding cradle 300 may be welded or otherwise connected to the interior of vessel header 101. Support structure welds 203 are not generally in horizontal alignment with welded connections 106, as support structure welds 203 are shown above the horizontal plane of welded connections 106 in FIG. 2B. The support structure welds 203 illustrated in FIG. 2B are shown as individual dots for illustration purposes. In embodiments, the support structure welds 203 may be any type of weld, including but not limited to, spot welds, stitch welds, or seal welds, as would be known to one skilled in the arts. The resulting weld configuration may reduce or eliminate any complications with meeting the ASME weld requirements, which may reduce installation difficulty. In addition, this weld configuration may reduce complications in maintaining a minimum 1-inch spacing between weld roots 204, and may allow for a reduction in flow tube spacing 112. In embodiments, the use of sliding cradle 300 to decrease flow tube spacing 112 may allow for an increase in the number of flow tubes 102 within vessel header 101, may increase the perforated section 132 within vessel header 101, and may increase the associated throughput capacity of devolatilizer vessel 100.

Figure 3C:
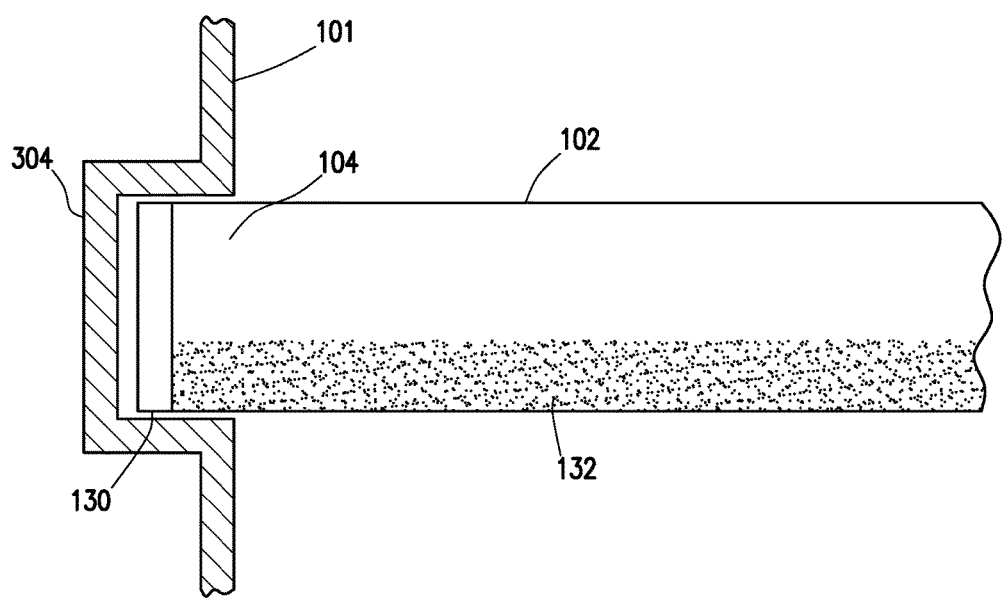
FIG. 3C is a cross-sectional side view of an internal support structure in accordance with certain embodiments of the present disclosure.

With reference to FIG. 3C, end 104 opposite vessel header penetration 109 may be supported by vessel header 101 using a design in which vessel header 101 forms a support recess 304. Vessel header 101 may be designed such that a small section of vessel header 101 is recessed outward from the interior of the vessel to allow end 104 to pass into support recess 304 and be supported. End 104 may slide in support recess 304 to allow for movement in response to thermal expansion forces. Flow tube end 104 may rest directly in support recess 304 or may rest indirectly in support recess 304 as a result of a moveable device, such as a sliding sleeve or bearing, being placed between the upper surface of support recess 304 and end 104 to allow for movement. Support recess 304 may be sealingly connected to vessel header 101 as a result of being formed at the same time as vessel header 101, being welded to vessel header 101, or any other method known to one skilled in the arts that is capable of forming a substantially sealed connection to vessel header 101. In embodiments, support recess 304 in vessel header 101 may extend less than or equal to 12 inches, or less than or equal to 6 inches, or less than or equal to 3 inches beyond the outer surface of vessel header 101. Perforated section 132 may extend substantially the entire length between the interior surfaces of vessel header 101, and thereby maximize the surface area available for perforated section 132.

Figure 4:
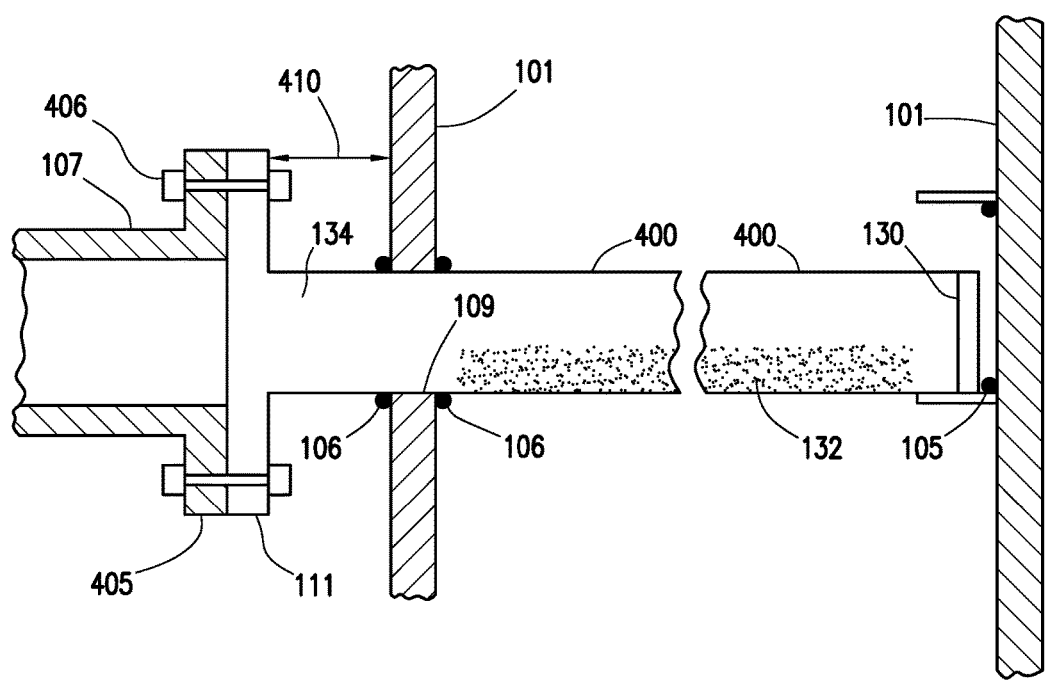
FIG. 4 is a cross-sectional side view of a welded lateral flow tube connection in accordance with certain embodiments of the present disclosure.

Referring to FIG. 4, welded flow tubes 400 may be connected directly to vessel header 101 through the use of welded connections 106 at vessel header penetrations 109. Welded connections 106 may structurally and sealingly connect welded flow tubes 400 to vessel header 101 while maintaining structural integrity of vessel header 101. With welded flow tube 400 welded to vessel header 101 at vessel header penetration 109, welded flow tube 400 is fixed and cannot be removed. Welded flow tube 400 may be connected to external distribution manifold 107 through the use of external manifold flange 405, flanged connection 111 on welded flow tube 400, and a connection device 406. In embodiments, connection device 406 may be a set of bolts in addition to a sealing mechanism, which may prevent leakage into or out of vessel header 101 from the flanged connection 111. The sealing mechanism may be packing, welding, washers, a stud flange, or any other means or methods known to those skilled in the arts. In embodiments, perforated portion 132 of welded flow tubes 400 may be wholly contained within vessel header 101 while flow section 134 extends from vessel header 101 interior through vessel header wall for connection to external distribution manifold 107 via external manifold flange 405. Welded flow tube 400 may extend a distance 410 from vessel header outer surface ranging from 48 inches to 1 inch, or from 18 to 3 inches, or from 12 to 6 inches.

Figure 5:
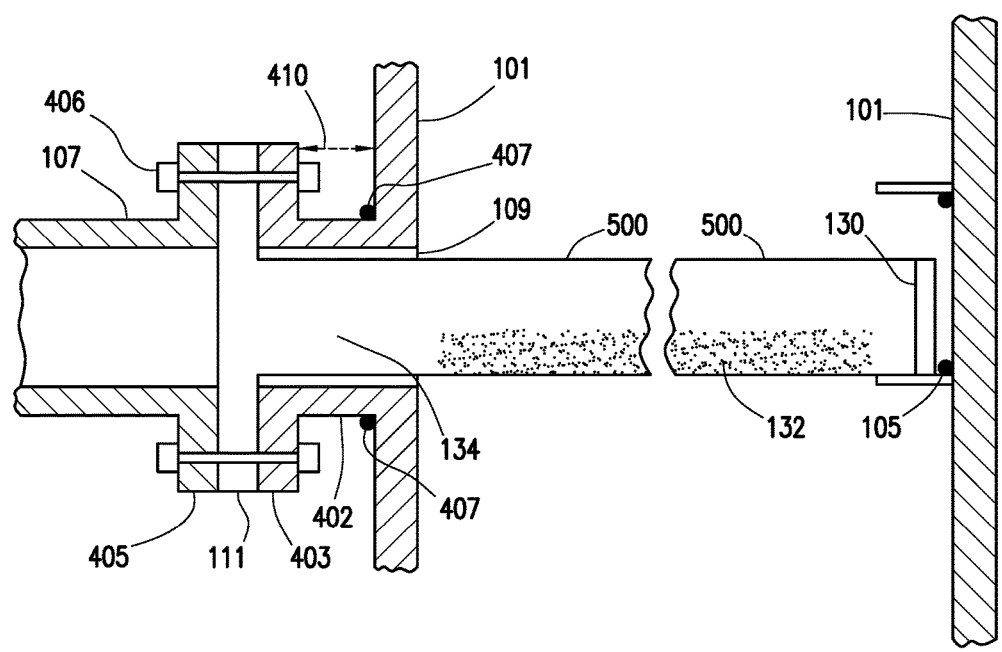
FIG. 5 is a cross-sectional side view of an externally flanged lateral flow tube connection in accordance with certain embodiments.

Referring to FIG. 5, flow tubes 500 may be externally flanged to vessel header penetrations 109. An externally flanged flow tube 500 refers to a flow tube 500 that is sealingly connected to vessel header 101 using a short section of pipe or conduit 402 that is larger in diameter than flow tube 500. The section of conduit 402 is welded via welds 407 or otherwise connected to the exterior of vessel header 101 and extended a short distance therefrom. In embodiments, an externally flanged flow tube connection may have a diameter ranging from 2 inches to 36 inches, or from 8 inches to 24 inches, or from 10 inches to 20 inches. The extended end of the pipe or conduit 402 may have a flange 403 to receive flanged connection 111 of flow tube 500 and external manifold flange 405 to receive external distribution manifold 107. The smaller diameter externally flanged flow tube 500 passes through the section of conduit 402 into vessel header 101. External manifold flange 405 may be connected to flanged connection 111 and flange 403 with connection device 406, such as a set of bolts and a sealing mechanism. Examples of sealing mechanisms include packing, washers, welding, stud flanges, and the like. Externally flanged flow tube 500 may be removed for cleaning or maintenance by removing connection device 406. In embodiments, flow section 134 may extend from flanged connection 111 to near the inside wall of vessel header 101, and perforated section 132 may extend across vessel 101 interior. Such embodiments combine a nearly wall to wall perforated section 132, or a complete wall to wall perforated section 132 when used in combination with support recess 304, with the ability to remove the flow tube 500 for cleaning and maintenance.

Figure 6A:
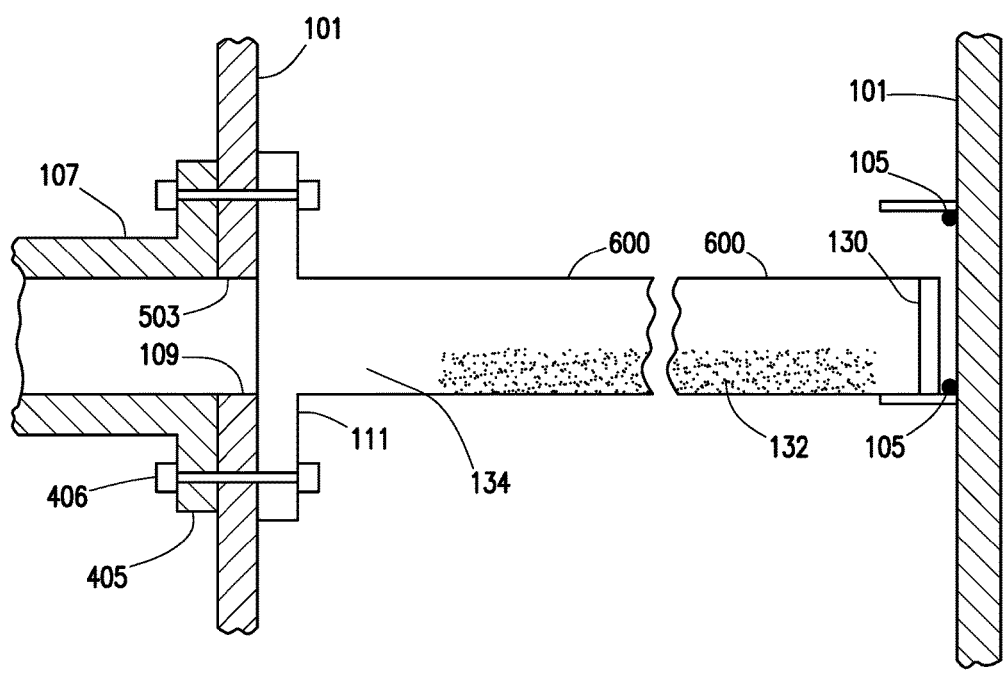
FIG. 6A is a cross-sectional view of an internally flanged lateral flow tube connection in accordance with certain embodiments of the present disclosure.

Referring to FIG. 6A, internally flanged flow tube 600 may be internally flanged to a vessel header penetration 109. Internally flanged flow tube 600 may refer to a connection in which vessel header 101 has a flanged connection in the vessel header wall 503, and internally flanged flow tube 600 has flanged connection 111 that is coupled to the connection in vessel header wall 503. Fluid is supplied by external distribution manifold 107 that is connected by external manifold flange 405 to the external surface of vessel header wall 503. External distribution manifold 107, vessel header wall 503, and flanged connection 111 may be coupled together using connection device 406, such as a set of bolts and a sealing mechanism. In embodiments, perforated portion 132 of the flow tube 600 may be reduced relative to flow tube 400 and flow tube 500 because a portion of flow tube 600 near flanged connection 111 on the inside of vessel header 101 cannot be perforated. Internally flanged nozzle 600 may be removed for cleaning by removal of the connection device 406. Internally flanged nozzle 600 design may result in a reduced fluid distribution system throughput capacity relative to externally flanged flow tubes 400 and 500 due to the reduction in the perforated section 132 of internally flanged nozzle 600.

Figure 6B:
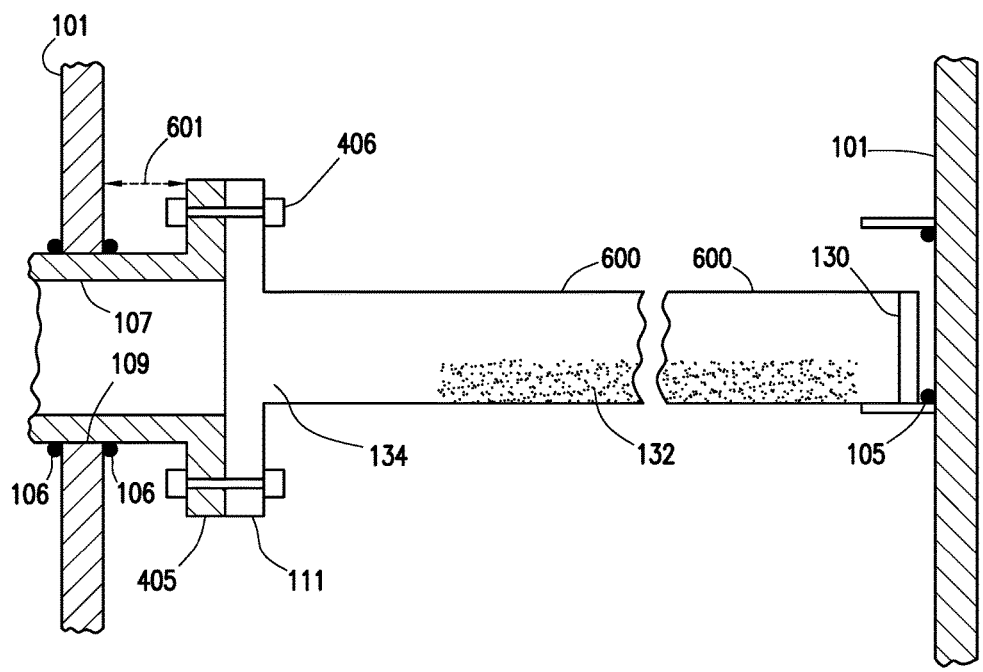
FIG. 6B is a cross-sectional view of an internally flanged lateral flow tube connection in accordance with certain embodiments of the present disclosure.

Referring to FIG. 6B, internally flanged flow tube 600 may be flanged within vessel header 101. External manifold flange 405 may be welded into vessel header penetration 109 with welded connections 106. External manifold flange 405 may extend into vessel header 101 a distance 601 that may be from 12 to 3 inches. External manifold flange 405 may be flanged to internally flanged flow tube 600 within vessel header 101. External manifold flange 405 and flanged connection 111 may be coupled together using connection device 406, such as a set of bolts and a sealing mechanism. In embodiments, perforated portion 132 may be reduced relative to externally flanged flow tubes 400 and 500 due to the extension of external manifold flange 405 within vessel header 101. Such embodiments allow internally flanged flow tube 600 to be removed for cleaning and maintenance by removal of the connection device 406. While FIGS. 4-6 each show the end of the flow tube supported via a support cradle, it should be understood that other supports such as a sliding cradle or support recess may be used in combination with any of the embodiments described herein.

Nozzle Design

Figure 7:
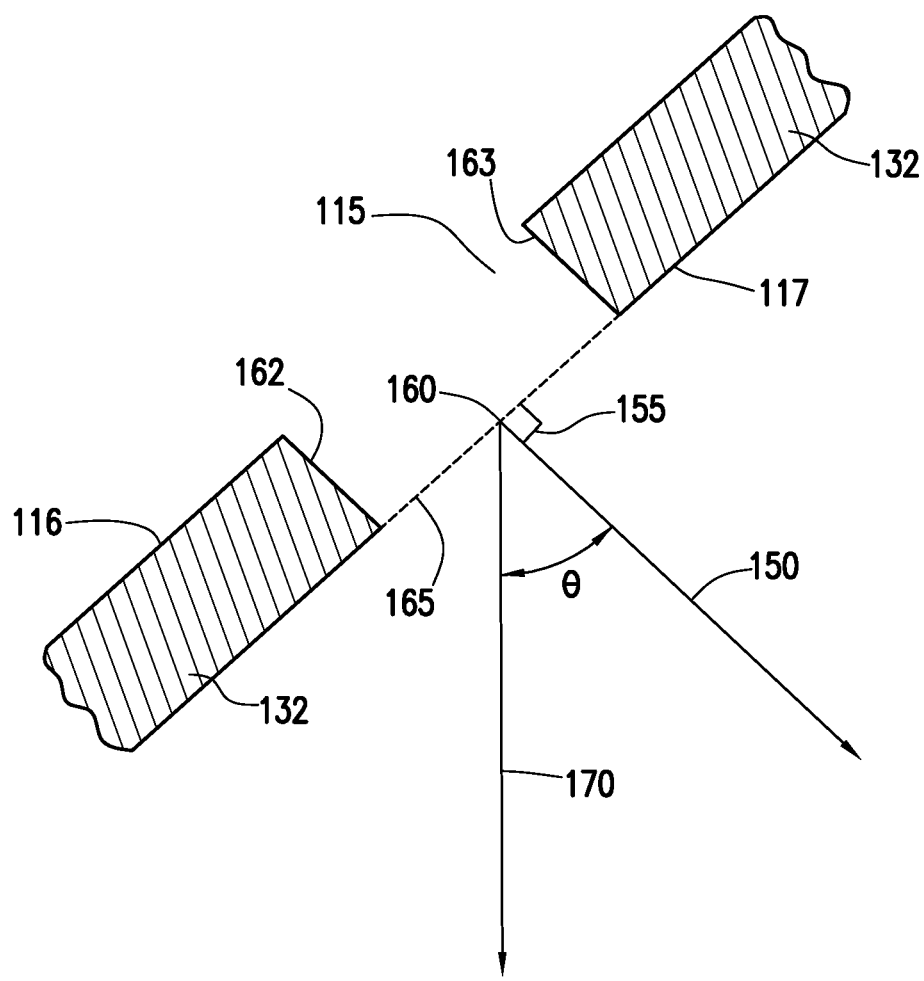
FIG. 7 is a magnified cross-sectional view of a nozzle hole showing a strand angle in accordance with certain embodiments of the present disclosure.

Each perforation in the devolatizer nozzle (i.e., the perforated section of the flow tube) may have a maximum strand angle. In some embodiments the devolatilizer nozzle has a majority of perforations that have a maximum strand angle of equal to or less than 45 degrees, or 52 degrees, or 52.5 degrees, or 65 degrees. With reference to FIG. 7, the strand angle may be used to adjust devolatilization of the polymer. As used herein, strand angle refers to an angle at which a polymer strand flows from the inside 116 of a flow tube to the outside 117 of the perforated section 132 of the flow tube and exits a perforation 115 relative to a vertical axis. More specifically, strand angle refers to an angle θ between (i) a strand line 150 extending outward 90 degrees (as shown by reference numeral 155) from a center point 160 of a plane 165 of the perforation 115 and (ii) a plumb line 170 extending from the center point 160 of the plane 165 of the perforation 115. The plumb line 170 may be about parallel to the direction of fall for a polymer strand exiting the perforation 115. Devolatilization efficiency may depend on strand spacing in the vertical axis. As used in here, strand spacing refers to center to center spacing of the strands along the lines parallel to plumb line 170. The optimum strand angle may be affected by the strand spacing and perforation 115 exiting diameter. In general, larger strand angles may require either one or both of larger strand spacing or smaller hole diameter to maintain devolatilization efficiency.

All or a portion of the perforations 115 may be constant diameter holes, tapered diameter holes, or combinations thereof. A constant diameter hole refers to holes having about the same diameter across the length of the hole, as is shown by parallel sidewalls 162 and 163, which are commonly produced for example by straight, constant diameter drill bits. A tapered diameter hole refers to holes having differing diameters on the inner and outer sides of the nozzle, wherein sidewalls 162 and 163 are not parallel across their entire lengths.

Without being bound by theory, it is believed that devolatilization efficiency is about constant for strand angles in a range of from zero to 65 degrees. It is further believed that devolatilization efficiency decreases significantly for strand angles greater than 65 degrees. In some embodiments, the perforated section 132 of the flow tube, or the entirety of the flow tube, has a cross-section such that the maximum strand angle ranges from about zero to 45 degrees, or 52 degrees, or 52.5 degrees, or 65 degrees. In embodiments, a majority of the perforations 115 or holes in the perforated section 132 of the flow tube, alternatively substantially all of the perforations 115 or holes in the perforated section 132 flow tube, have a maximum strand angle of equal to or less than 45 degrees, or 52 degrees, or 52.5 degrees, or 65 degrees. In embodiments, equal to or greater than 50, 60, 70, 80, 90, 95, or 99 weight percent of the polymer strands exit the flow tube at a maximum strand angle of equal to or less than 45 degrees, or 52 degrees, or 52.5 degrees, or 65 degrees. The maximum strand angle may vary depending on the strand spacing, strand diameter, strand taper, material being devolatized, and perforation 115 diameter used for a particular design.

Figure 8:
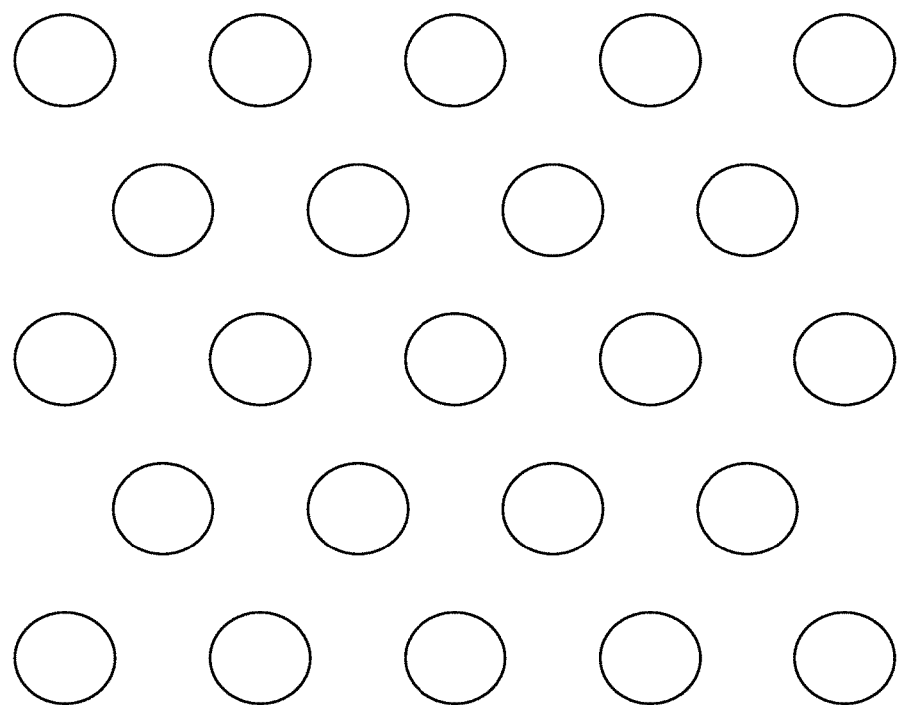
FIG. 8 is a schematic of a nozzle hole pattern in accordance with certain embodiments of the present disclosure.

The drillable length or area of the perforated section 132 may be adjusted to control devolatilization of the polymer. Drillable length refers to the linear distance along the perimeter of a perforated section cross section where holes drilled in the flow tube result in a suitable strand angle for devolatilization. The drillable area of a given flow tube is the product of the drillable length multiplied by the unobstructed length of the flow tube. The length of the flow tubes as well as other physical dimensions of the flow tube may be limited by overall process design considerations, for example positioning and support of the flow tube within the vessel body. The total drillable area is the sum of the drillable area for all the flow tubes. The hole size, density, or both may have an effect on devolatilization efficiency. Hole density refers to the number of holes per unit area such as square inch. Hole size refers to the average diameter of the perforations 115 in the flow tube. In embodiments, the hole diameter is from about 1/32 inch to about 7/64 inch, from about 2/64 inch to about 7/64 inch, or from about 3/64 inch to about 7/64 inch. In embodiments, the hole density is from about 10 to about 400 holes/in$^2$, or from about 50 to about 55 holes/in$^2$, or about 52 holes/in$^2$. In an embodiment, the holes may be about evenly spaced within the drillable area, for example in a 60 degree, triangular pitch pattern as shown in FIG. 8. In embodiments, the center-to-center hole spacing is about 5/32 inch. In embodiments, hole size is chosen to be the smallest possible while avoiding fouling characteristics of the particular polymer or process fluid. The hole spacing may be chosen by balancing multiple factors, including strength requirements (where larger spacing may be desired), devolatization/hole density requirements (where smaller spacing may be desired), and the tendency for strands to clump when placed too close together. For example and without limitation, hole density in a steel plate may be about equal to or greater than 0.7.

Figure 9:
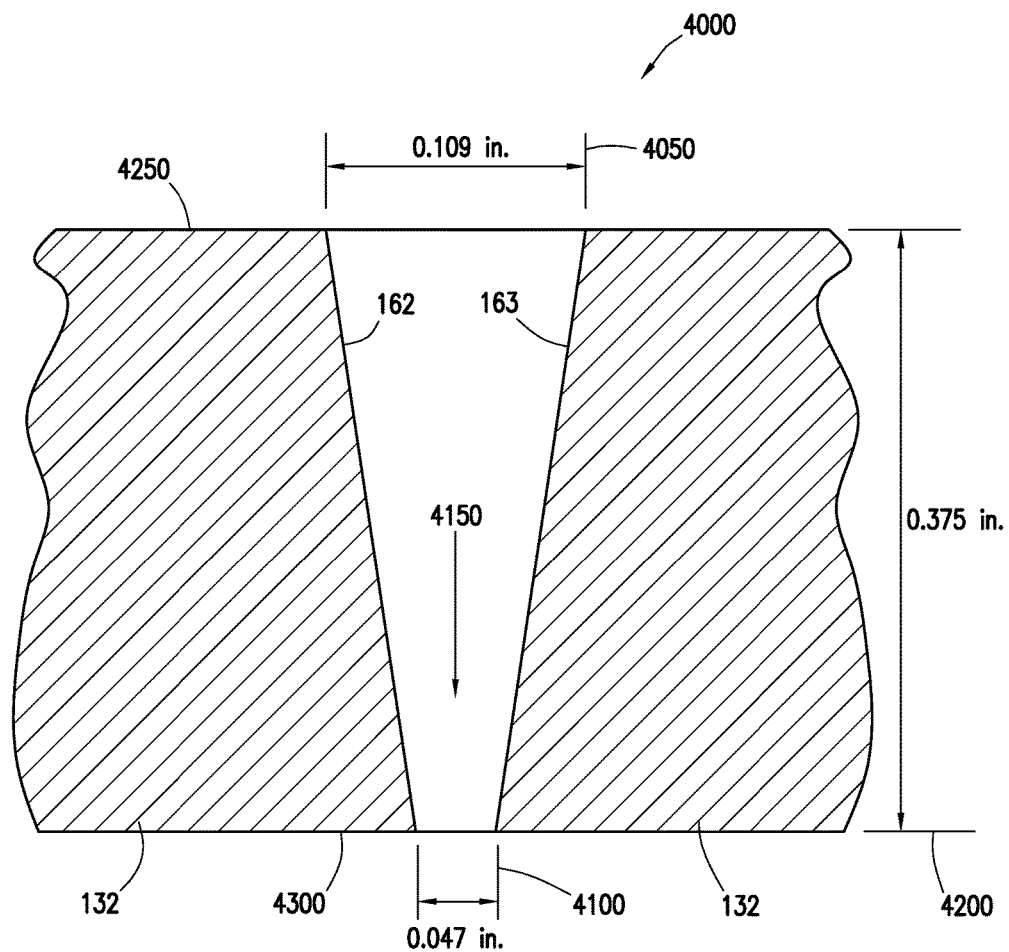
FIGS. 9 and 10 are magnified cross-sectional views of tapered nozzle holes in accordance with certain embodiments of the present disclosure.

FIG. 9 illustrates an embodiment of a tapered hole 4000 having an inner diameter 4050 on the inner nozzle wall 4250 and an outer diameter 4100 on the outer nozzle wall 4300. Molten polymer may flow from the inner diameter of the tapered hole 4000 to the outer diameter of the tapered hole 4000 to form a strand, as indicated by reference flow arrow 4150. The length of the hole 4200 is equal to the thickness of the wall of perforated section 132. In embodiments, the inner diameter 4050 may be smaller than the outer diameter 4100. Alternatively, the inner diameter 4050 may be larger than the outer diameter 4100. The taper may be a linear taper, which refers to an about constant rate of change, or slope, between the inner and outer diameters. Some embodiments include linear tapered holes having an inner diameter of about 7/64 inch, outer diameter of about 3/64 inch, and a length of about 0.375 inch. Actual hole length and diameters may vary with nozzle pressure rating requirements, polymer flow, polymer properties, and devolatization goals.

Figure 10:
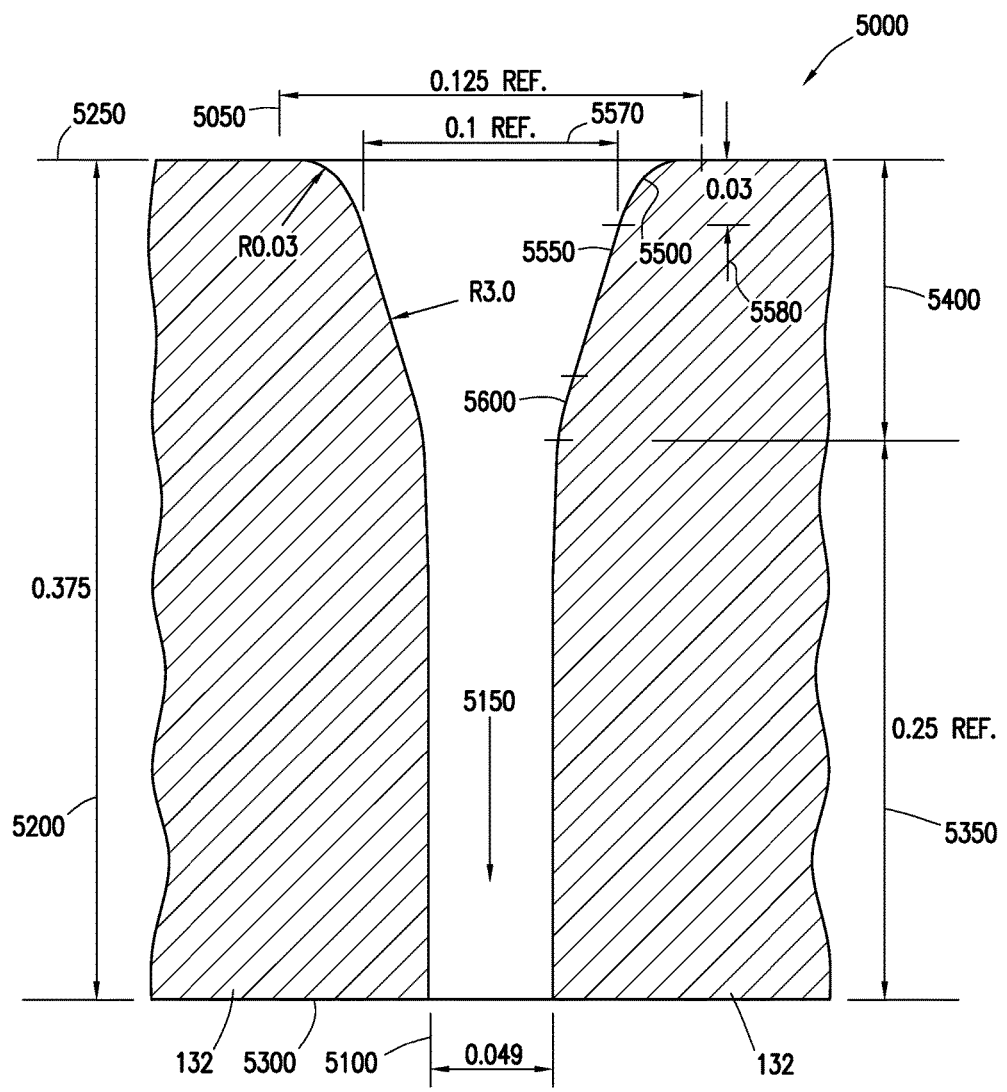

FIG. 10 illustrates an alternative embodiment of a tapered hole 5000 having an inner diameter 5050 on the inner nozzle wall 5250, an outer diameter 5100 on the outer nozzle wall 5300, and a length 5200. Molten polymer flow from the inner diameter of the hole to the outer diameter of the hole to form a strand, as indicated by reference flow arrow 5150. The tapered profile in FIG. 5 may be referred to as a funnel taper or a multiple internal tapered hole having an about constant diameter portion 5350 and a non-constant diameter portion 5400. The non-constant diameter portion 5400 may further comprise a linear profile, a non-linear profile, or combinations thereof. The length of the constant diameter portion 5350 may be about less than, equal to, or greater than the length of the non-constant diameter portion 5400. In embodiments, the length of the constant diameter portion 5350 is greater than the length of the non-constant diameter portion 5400, for example about twice the length of the non-constant diameter portion 5400.

The taper may funnel polymer from a larger inner diameter 5050 to a smaller outer diameter 5100. Alternatively, the taper may form an inverted funnel (or horn) to flow polymer from a smaller inner diameter 5050 to a larger outer diameter 5100. The non-constant diameter portion 5400 may include a shoulder portion 5500 having a slightly curving diameter between the inner diameter 5050 and a shoulder diameter 5570 and a shoulder height 5580. The non-constant diameter portion 5400 may include a slightly curving throat portion 5600 adjacent to and feeding into the about constant diameter portion 5350. The non-constant diameter portion 5400 may include an about linear portion 5550 between the shoulder portion 5500 and throat portion 5600. In embodiments, the funnel tapered holes (multiple internal tapered holes) have an inner diameter of about 0.125 inch, a shoulder diameter of about 0.1 inch, a shoulder height of about 0.03, an outer diameter of about 0.049, an about constant diameter portion length of about 0.25 inch, and a non-constant diameter portion length of about 0.125. The entrance edges depicted in FIG. 10 are not sharp or flat, but instead are a curvature of initial radius of 0.03 inches (R0.03), and second, internal taper of radius 3.0 inches (R3.0). Tapered or rounded edges and transition sections tend to reduce pressure drop.

In some embodiments, tapered holes may be employed in a devolatilizer nozzle in order to decrease the strength requirements of the nozzle structure. Such tapered holes decrease strength requirements by decreasing pressure drop from the inside to the outside of the nozzle. Incorporation of tapered holes may reduce heightened strength requirements that may arise as other enhancements intended to reduce volatile content are introduced. For example, use of tapered holes may alleviate the need for stronger materials that may complicate manufacturability and be more expensive. Likewise, tapered holes may help offset increased stress and strain associated with certain nozzle cross-sections. In embodiments, tapered holes may reduce pressure drop across a devolatilizer nozzle by equal to or greater than about 50, 60, 70, 80, or 85 percent relative to an otherwise identical devolatilizer nozzle having constant diameter holes. In embodiments, the stress concentration in a steel plate due to the tapered holes is about 2.41. Without being bound by theory, it is believed that the funnel taper provides a dual benefit in that: (a) the larger inner diameter will provide for significant pressure drop reductions; and (b) the about constant diameter portion may make the polymer strand less susceptible to swelling. Again, without being bound by theory, the about constant diameter portion may make the polymer strand less susceptible to swelling by providing a physical mold as well as residence time for polymer chains to orient in the flow or strand direction.

Nozzle perforations may be made by drilling or by water jet technology or by laser drilling or other machining methods. Constant diameter holes may be made with straight drill bits. For example, a linear tapered hole may be made with a tapered (e.g., conical) drill bit or by reaming with a straight bit. A funnel tapered hole (multiple internal tapered hole) may be made by a water jet or by drilling a straight hole followed by a tapered drill bit or reaming a portion of the hole. The holes may be made either before or after final fabrication. For example, holes may be formed by perforating metal sheets such as steel sheets, which may be subsequently cut, bent, welded, etc. to form the final nozzle assembly. Alternatively, the flow tubes can be drilled after fabrication.

The strength of the devolatilizer nozzle may be sufficient to withstand the stresses and strains associated with the pressure of forcing polymer through the nozzle perforations. Factors contributing to a determination of suitable nozzle strength include hole diameter and density, nozzle wall thickness and shape, material of construction, and mass flow rate of polymer through the nozzle and associated pressures. The stress and strain for a given nozzle design may be analyzed using finite element analysis, for example by using commercially available modeling software such as ABAQUS® software available from Abaqus, Inc. In embodiments, finite element analysis may be carried out with ABAQUS® Standard software using two and three-dimensional shells, assuming linear elastic material behavior, and using a modulus of elasticity for steel of $29 \times 10^6$ psi and Poisson's ratio for steel of 0.29. In general, lowering the material stress, and in particular point or concentrated stress such as at a bend or corner in a nozzle, lowers the overall strength requirements for the nozzle material and thereby allows less costly materials to be used.

The devolatilizer nozzles provided herein may be formed from metal plates, such as steel plates. The steel plates may be processed, shaped, and assembled according to parameters set forth herein by known metal working techniques such as cutting, stamping, milling, welding, and the like. The type of steel selected may be such that prior to tempering it is sufficiently ductile to minimize manufacturing difficulties during the steps of perforating the plate and forming it into the shape of a nozzle. If the steel plate is not sufficiently ductile or is overly hard, resulting manufacturing difficulties may raise costs. Harder steels are also more susceptible to brittle failures. A balance may be achieved between the need for greater strength and the need for manufacturability. In some embodiments, the steel plate is annealed to enhance ductility prior to perforating and forming the nozzle. However, the devolatilizer nozzles may be fabricated from any suitable materials known to those of skill in the art.

In addition to possessing sufficient ductility, the type of steel may be such that tempering renders the finished devolatilizer nozzle capable of resisting the stresses and strains described herein. In embodiments, the devolatilizer nozzle, or a plate to be used to form the devolatilizer nozzle, may be subjected to a treatment, such as a heat treatment or annealing process, in order to achieve a suitable stress and/or strain tolerance. In certain embodiments the steel comprises stainless steel; alternatively, any AISI (American Iron and Steel Institute) 400 series stainless steel; alternatively, a treated AISI 400 series stainless steel; alternatively, heat treated 304 stainless steel; alternatively, 420 stainless steel; alternatively, 420F stainless steel; alternatively, 440A stainless steel; alternatively, AL-6XN stainless steel; or alternatively LDX 2101 stainless steel. In embodiments, the nozzle is constructed of 0.375 in thick sheet steel.

The flow rate of polymer through the nozzle may be impacted by, among other things, polymer characteristics such as viscosity, the drillable length and area of the nozzle, the nozzle hole density, and the nozzle pressure. The total flow rate of polymer through the nozzle may be expressed in lb/hr, which may be further divided by the total number of nozzle holes to get the flow rate per hole expressed in lb/hr/hole. In embodiments, the devolatilizer nozzle may be operated at a polymer pressure equal to or less than about 800, 700, 600, 500, 400, 300, 200, 100, or 50 psig. The strands are typically exposed to a vapor space pressure equal to or less than about 30, 20, 10, 5, 1, or 0.2 torr to maximize devolatization efficiency.

Figure 11:
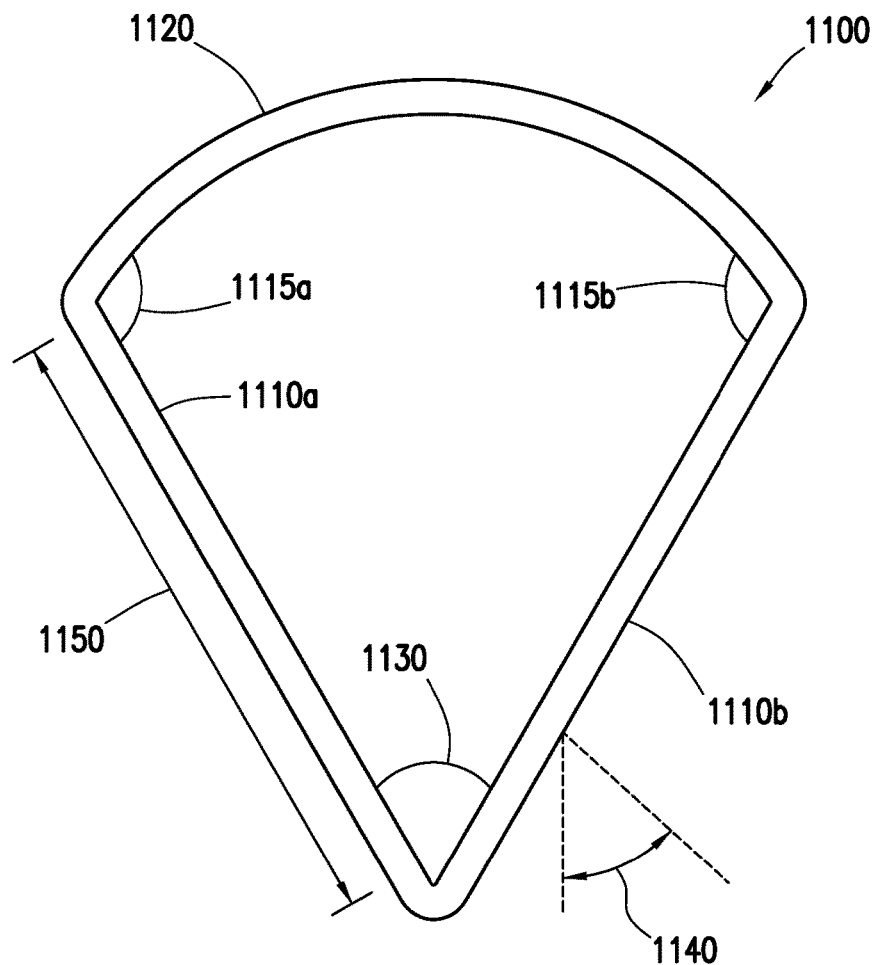
FIG. 11 is a cross-sectional view of a devolatilizer nozzle having a cross-section in the shape of an elliptical sector in accordance with certain embodiments of the present disclosure.

The perforated sections of the flow tubes (i.e., the devolatilizer nozzles) may have a non-circular cross-section. The non-circular cross-section may have equal to or greater than 3 sides. For example and without limitation, the non-circular cross-section may have the shape of a circular sector, an elliptical sector, or an irregular quadrilateral, also referred to herein as having the shape of an "ice cream cone" or a "parachute." A circular sector is a portion of a circle enclosed by two radii of the circle and a portion of an arc of the circle (i.e., a portion of a perimeter of the circle). An elliptical circular sector is a portion of an ellipse enclosed by two radii and an arc of the ellipse (i.e., a portion of a perimeter of the ellipse). An irregular quadrilateral is a polygon with four sides in which not all sides and all angles are congruent. FIG. 11 depicts an embodiment of a devolatilizer nozzle having such a non-circular cross-section 1100. The non-circular cross-section 1100 has the shape of an elliptical sector. The non-circular cross-section 1100 has three sides 1110a, 1110b, and 1120. Sides 1100a and 1110b may be straight sides, and may have the same length in some embodiments. Side 1120 may be an arc, and connects with sides 1110a and 1110b at included angles 1115a and 1115b that may be greater than 90 degrees. The included angle 1130 at which sides 1110a and 1110b meet may be equal to or greater than 70 degrees or 76 degrees. In some embodiments, the included angle 1130 is 90 degrees or less. One having ordinary skill in the art with the benefit of this disclosure will understand that the arc 1120 need not be a continuous curve, but may be formed from one or more arc segments within the scope of this disclosure. Additionally, one having ordinary skill in the art with the benefit of this disclosure will understand that any corners may be rounded without deviating from the scope of this disclosure. Sides 1110a and 1110b may include drillable length 1150 of non-circular cross-section 1100. Drillable length 1150 is the length along each of sides 1110a and 1110b in which the strand angle 1140 is constant and at most 45 degrees, or 52 degrees, or 52.5 degrees, or 65 degrees. The drillable length 1150 is less than the length of sides 1110a and 1110b because each side begins to curve as it approaches a corner, which decreases or increases the strand angle from the constant of at most 45 degrees, or 52 degrees, or 52.5 degrees, or 65 degrees. Perforations are present only across the drillable length 1150 of non-circular cross-section 1100. Each flow tube 109 and perforated section 132 depicted in FIGS. 1A, 1B, 2A, 2B, 3A, 3B, 3C, 4, 5, 6A and 6B may have the non-circular cross-section depicted in FIG. 11.

Figure 12:
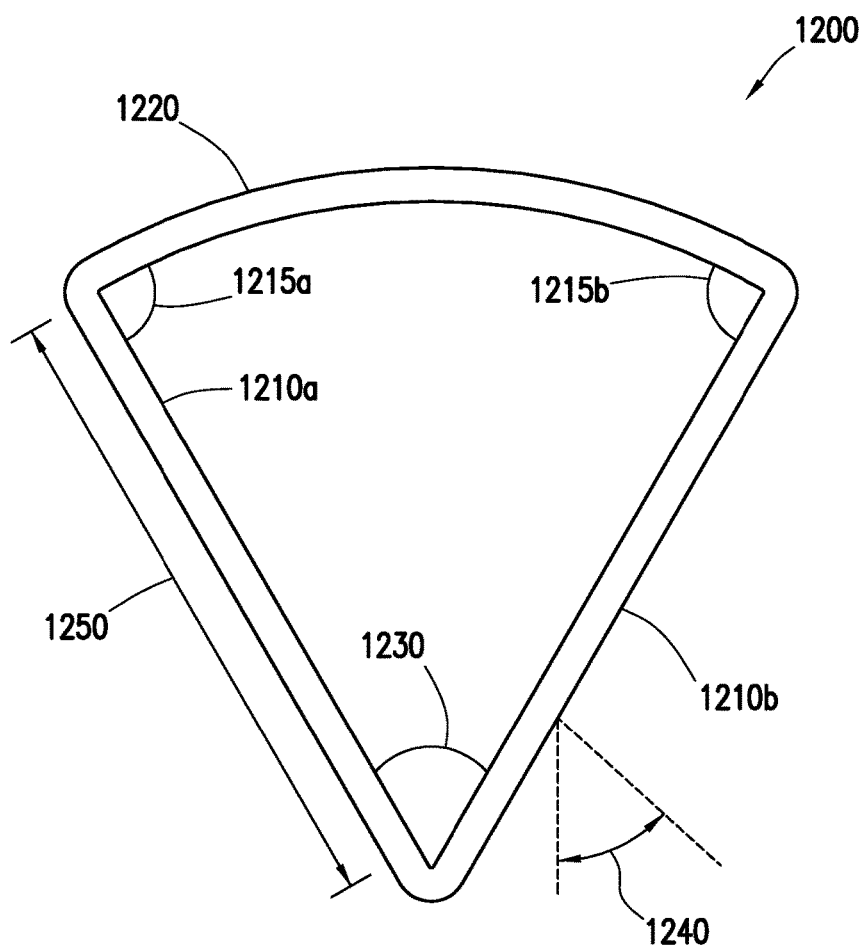
FIG. 12 is a cross-sectional view of devolatilizer nozzle having a cross-section in the shape of a circular sector in accordance with certain embodiments of the present disclosure.

FIG. 12 depicts an embodiment of a devolatilizer nozzle having such a non-circular cross-section 1200. The non-circular cross-section 1200 has the shape of a circular sector. The non-circular cross-section 1200 has three sides 1210a, 1210b, and 1220. Sides 1200a and 1210b may be straight sides, and may have the same length in some embodiments. Side 1220 may be an arc, and connects with sides 1210a and 1210b at included angles 1215a and 1215b that may be greater than 90 degrees. The included angle 1230 at which sides 1210a and 1210b meet may be equal to or greater than 70 degrees or 76 degrees. In some embodiments, the included angle 1230 is 90 degrees or less. One having ordinary skill in the art with the benefit of this disclosure will understand that the arc 1220 need not be a continuous curve, but may be formed from one or more arc segments within the scope of this disclosure. Additionally, one having ordinary skill in the art with the benefit of this disclosure will understand that any corners may be rounded without deviating from the scope of this disclosure. Sides 1210a and 1210b may include drillable length 1250 of non-circular cross-section 1200. Drillable length 1250 is the length along each of sides 1210a and 1210b in which the strand angle 1240 is constant and at most 45 degrees, or 52 degrees, or 52.5 degrees, or 65 degrees. The drillable length 1250 is less than the length of sides 1210a and 1210b because each side begins to curve as it approaches a corner, which decreases or increases the strand angle from the constant of at most 45 degrees, or 52 degrees, or 52.5 degrees, or 65 degrees. Perforations are present only across the drillable length 1250 of non-circular cross-section 1200. Each flow tube 109 and perforated section 132 depicted in FIGS. 1A, 1B, 2A, 2B, 3A, 3B, 3C, 4, 5, 6A and 6B may have the non-circular cross-section depicted in FIG. 12.

Figure 13:
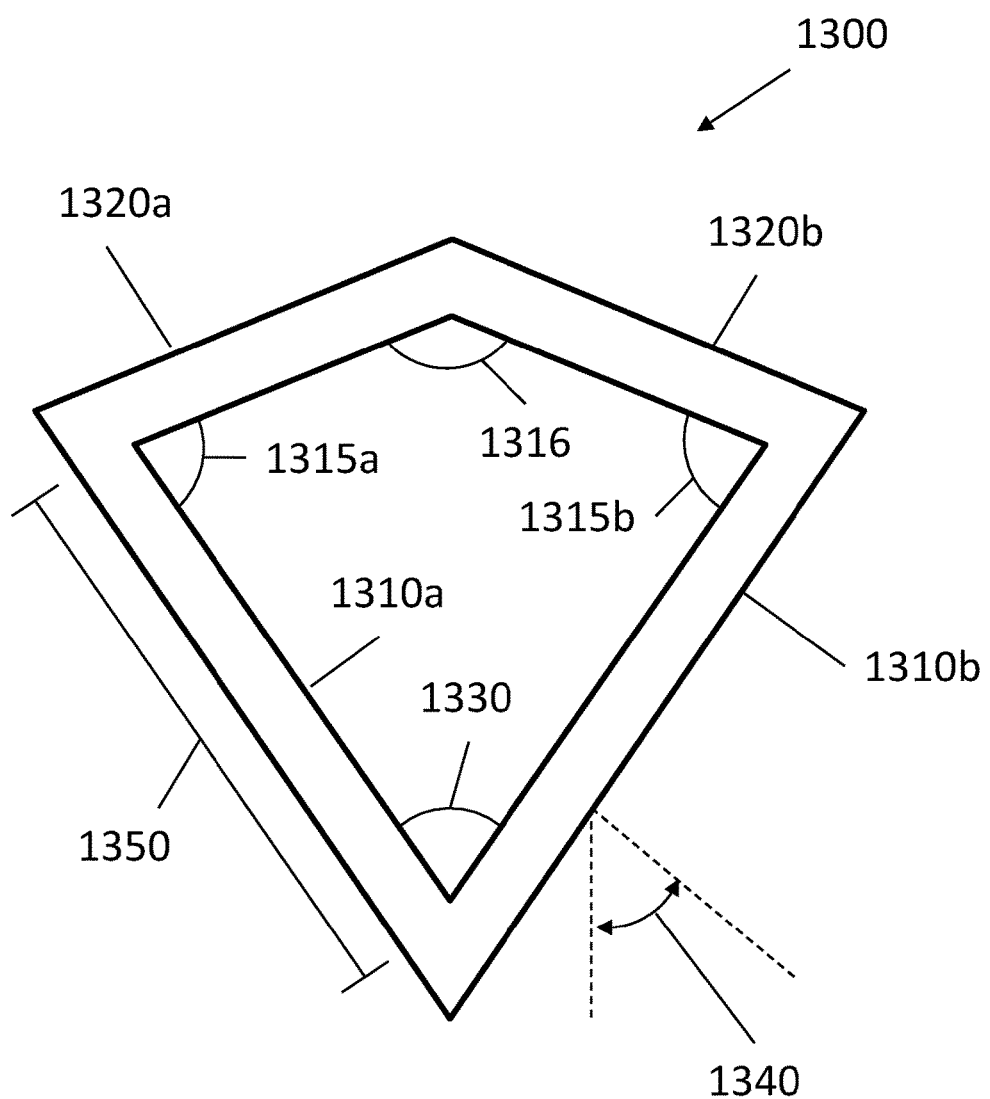
FIG. 13 is a cross-sectional view of devolatilizer nozzle having a cross-section in the shape of an irregular quadrilateral in accordance with certain embodiments of the present disclosure.

FIG. 13 depicts an embodiment of a devolatilizer nozzle having such a non-circular cross-section 1300. The non-circular cross-section 1300 has the shape of an irregular quadrilateral. The non-circular cross-section 1300 has four sides 1310a, 1310b, 1320a, and 1320b. Sides 1300a and 1310b may be straight sides, and may have the same length in some embodiments. Sides 1320a and 1320b may be straight sides that connect together at angle 1316, and connect with sides 1310a and 1310b at included angles 1315a and 1315b, which may be greater than 90 degrees. The included angle 1330 at which sides 1310a and 1310b meet may be equal to or greater than 70 degrees or 76 degrees. In some embodiments, the included angle 1330 is 90 degrees or less. One having ordinary skill in the art with the benefit of this disclosure will understand that the sides 1320a and 1320b need not be a formed of two continuous straight sides, but may be formed from more straight segments within the scope of this disclosure. Additionally, one having ordinary skill in the art with the benefit of this disclosure will understand that any corners may be rounded without deviating from the scope of this disclosure. Sides 1310a and 1310b may include drillable length 1350 of non-circular cross-section 1300. Drillable length 1350 is the length along each of sides 1310a and 1310b in which the strand angle 1340 is constant and at most 45 degrees, or 52 degrees, or 52.5 degrees, or 65 degrees. The drillable length 1350 is less than the length of sides 1310a and 1310b because each side begins to curve as it approaches a corner, which decreases or increases the strand angle from the constant of at most 45 degrees, or 52 degrees, or 52.5 degrees, or 65 degrees. Perforations are present only across the drillable length 1350 of non-circular cross-section 1300. Each flow tube 109 and perforated section 132 depicted in FIGS. 1A, 1B, 2A, 2B, 3A, 3B, 3C, 4, 5, 6A and 6B may have the non-circular cross-section depicted in FIG. 13.

In general, the drillable length of the cross-section is located on a lower portion of the cross-section such that polymer strands may extend downward from the perforate section via gravity in the devolatilization vessel without obstruction. In embodiments, the cross-sections shown in FIGS. 11-13 have an about equal cross-sectional area of 754 $in^2$ (an equivalent diameter of 15.5 inches), with the understanding that any suitable cross-sectional area may be selected according to overall process and design considerations. For the same cross-sectional area, variations in nozzle cross-sectional shape may cause variations in, among other things, drillable area and number of perforations, strand angle, stress, strain, and volatile content in the devolatilized polymer.

Cross-sectional area may be relevant in designing for pressure drops and uniform flow distribution. Cross-sectional shapes may be compared on a constant width-to-drillable-area basis to optimize the flow tube sizing and to maximize the total hole number for a given vessel size. As discussed previously, devolatilization efficiency decreases significantly for strand angles greater than 65 degrees.

The non-circular cross-sectional shapes described in FIGS. 11-13 have corners or bends. To minimize stress and strain, the corners may be fabricated with a bend radius. Larger bend radi provide lower stresses, but also lead to a loss of drillable area. The ideal bend radi depends on pressure rating requirements, steel thickness, type of steel or material of construction, and fabrication methods. The bend radi may be less than or equal to 4, 3, 2, 1.5, 1, 0.75, or 0.5 inches.

The following equations may be used to predict styrene monomer levels in polystyrene devolatilized with nozzles having non-circular cross-sections for a polymer flow rate of from about 0.003 to about 1 lb/hr/hole, alternatively from about 0.3 to 1 lb/hr/hole, alternatively about 0.049 lb/hr/hole, at 469° F.:

$$V_{\theta=0} = 0.5883 \rho^{1.3935} \quad (1)$$

$$V_\theta = 0.0086\rho^2 - 0.5664\rho + 0.0719\rho\theta - 0.1578\theta - 8.3127 \quad (2)$$

$$V = \alpha_0 V_0 + \alpha_\theta V_\theta \quad (3)$$

In the equations, V is the styrene volatile levels in ppm, $\rho$ is the operating pressure of the nozzle in torr (which may also be the exit pressure from an upstream flash devolatilizer), $\alpha_0$ is the fraction of holes with a strand angle $\theta$ equal to zero degrees, and $\alpha_\theta$ is the fraction of holes with a strand angle greater than zero and less than or equal to 45 degrees, or 52 degrees, or 52.5 degrees, or 65 degrees. In embodiments, devolatilizer nozzles having the non-circular cross-sections disclosed herein are capable of producing polystyrene having less than 100 ppm at an operating pressure of equal to or less than 30 torr.

In embodiments, a nozzle having the non-circular cross-sections, 1100, 1200 and 1300 of FIGS. 11-13 include tapered holes to further reduce stress and/or strain on the nozzle, and such a nozzle may be made for example from 304 stainless steel, alternatively AL-6XN stainless steel, alternatively LDX 2101 stainless steel. In embodiments, a nozzle having a cross-section of FIG. 11 or FIG. 12 or FIG. 13 may provide a devolatilized polymer (e.g., polystyrene) having equal to or less than about 100 ppm, or alternatively equal to or less than about 50 ppm, volatiles (e.g., styrene monomer).

Vessel Header Design & Nozzle Design

The vessel header design as described herein, embodiments of which are depicted in FIGS. 1A-6B, is used in combination with the devolatilization nozzle design as described herein, embodiments of which are depicted in FIGS. 7-13. For example, the flow tubes or at least the perforated section of the flow tubes of the vessel header design depicted in FIGS. 1A-6B may have: (1) the strand angle depicted in FIG. 7; (2) the perforation arrangement depicted in FIG. 8; (3) one or more of the perforation shapes depicted in FIG. 7, 9 or 10; (4) the non-circular cross section depicted in FIG. 11 or FIG. 12 or FIG. 13; (5) or combinations thereof.

Also disclosed herein is a method of devolatilizing a polymer. The method includes passing a molten polymer through a vessel header as described herein to a devolatilizer nozzle as described herein. A majority of the strands may exit the devolatilizer nozzle at a maximum strand angle of equal to or less than 45 degrees, or 52 degrees, or 52.5 degrees, or 65 degrees. The devolatilized polymer may be polystyrene containing equal to or less than about 1000 ppm of styrene monomer.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A devolatilizer vessel comprising:
a vessel header comprising a plurality of alternating vessel header penetrations; and
a plurality of lateral flow tubes arranged in a parallel configuration, wherein each lateral flow tube enters the vessel header through one of the alternating vessel header penetrations with a single vessel header penetration per lateral flow tube, wherein each lateral flow tube comprises a perforated section located within the vessel header, the perforated section comprising a non-circular cross-section, wherein the non-circular cross-section has the shape of a circular sector, an elliptical sector, or an irregular quadrilateral, wherein the non-circular cross-section has two straight sides, wherein a third side of the non-circular cross-section is an arc, wherein the two straight sides connect at an angle that is equal to or more than 70-76 degrees, and wherein each straight side connects with the arc at an angle that is greater than 90 degrees.

2. The devolatilizer vessel of claim 1, wherein the perforations in the perforated section extend only across a portion of the two straight sides of the non-circular cross-section.

3. The devolatilizer vessel of claim 1, wherein a majority of perforations in the lateral flow tubes have a maximum strand angle of equal to or less than 65 degrees.

4. The devolatilizer vessel of claim 1, wherein the perforations in the lateral flow tubes are tapered holes.

5. The devolatilizer vessel of claim 4, wherein all or a portion of the tapered holes have a linear taper.

6. The devolatilizer vessel of claim 4, wherein all or a portion of the tapered holes are multiple internal tapered holes.

7. The devolatilizer vessel of claim 1, wherein the lateral flow tubes are in fluid communication with an external distribution manifold.

8. The devolatilizer vessel of claim 1, wherein the lateral flow tubes are formed of 304 stainless steel, AL-6XN stainless steel, or LDX 2101 stainless steel.

9. The devolatilizer vessel of claim 1, wherein the lateral flow tubes are welded into the vessel header penetrations, or wherein the lateral flow tubes are internally flanged to the vessel header penetrations, or wherein the lateral flow tubes are externally flanged to the vessel header penetrations.

10. The devolatilizer vessel of claim 9, wherein the lateral flow tubes are externally flanged to the vessel header penetrations, and wherein the external flanges are arranged in a staggered configuration.

11. The devolatilizer vessel of claim 1, further comprising internal support structure supporting each lateral flow tube within the vessel header opposite the corresponding vessel header penetration.

12. The devolatilizer vessel of claim 11, wherein the internal support structure accommodates horizontal expansion or contraction of the lateral flow tube.

13. The devolatilizer vessel of claim 11, wherein the internal support structure is a sliding cradle comprising a support rail located opposite the vessel header penetration and above the lateral flow tube and a sliding hanger connecting the support rail and the lateral flow tube.

14. The devolatilizer vessel of claim 11, wherein the internal support structure comprises a support cradle located opposite the corresponding vessel header penetration on which the lateral flow tube rests.

15. The devolatilizer vessel of claim 14, wherein the support cradle is interior to the vessel header wall, or wherein the support cradle is exterior to the vessel header wall.

16. The devolatilizer vessel of claim 14, wherein the support cradle is welded to the vessel interior.

17. The devolatilizer vessel of claim 16 wherein the support cradle is welded to the vessel interior along one or more weld arcs positioned inside the support cradle.

18. The devolatilizer vessel of claim 16, wherein the support cradle is welded to the vessel interior along one or more weld arcs positioned inside the support cradle such that a weld root spacing between the weld arcs and vessel header penetration welds is minimized.

19. The devolatilizer vessel of claim 1, wherein the lateral flow tubes are welded into the vessel header penetrations and are externally flanged to an external distribution manifold or internally flanged to the external distribution manifold.

20. The devolatilizer vessel of claim 1, wherein the lateral flow tubes are externally flanged to the vessel header penetrations and to an external distribution manifold.

21. The devolatilizer vessel of claim 1, further comprising an internal support structure supporting the lateral flow tubes within the vessel header opposite the vessel header penetrations, wherein the lateral flow tubes are welded into the vessel header penetrations and are externally flanged to an external distribution manifold, and wherein the perforated sections of the lateral flow tubes extend substantially the entire length of the lateral flow tubes from the vessel header penetrations to the internal support structure.

22. The devolatilizer vessel of claim 1, further comprising an internal support structure supporting the lateral flow tubes within the vessel header opposite the vessel header penetrations, wherein the lateral flow tubes are externally flanged to the vessel header penetrations and to an external distribution manifold, and wherein the perforated sections of the lateral flow tubes extend substantially the entire length of the lateral flow tubes from the vessel header penetrations to the internal support structure.

23. The devolatizer vessel of claim 1, wherein the non-circular cross-section has the shape of an irregular quadrilateral.

24. A method comprising:
passing a molten polymer through lateral flow tubes of a vessel header of a devolatilizer vessel, wherein the lateral flow tubes are arranged in a parallel configuration and enter the vessel header through a plurality of alternating vessel header penetrations with a single vessel header penetration per lateral flow tube;
wherein the molten polymer exits the lateral flow tubes as strands through perforations in the lateral flow tubes within the vessel header, and wherein the lateral flow tubes have a non-circular cross-section, and wherein the non-circular cross-section has the shape of a circular sector, an elliptical sector, or an irregular quadrilateral, wherein the non-circular cross-section has two straight sides, wherein a third side of the non-circular cross-section is an arc, wherein the two straight sides connect at an angle that is equal to or more than 70-76 degrees, and wherein each straight side connects with the arc at an angle that is greater than 90 degrees; and
obtaining devolatilized polymer from the devolatilizer vessel.

25. The method of claim 24, wherein a majority of the strands exit the perforations at a maximum strand angle of equal to or less than 52.5 degrees.

26. The method of claim 24, wherein the devolatilized polymer is polystyrene comprising equal to or less than about 1000 ppm of styrene monomer.

* * * * *